United States Patent [19]

Clapp et al.

[11] 4,304,798

[45] Dec. 8, 1981

[54] HEXITOL BORATE COMPOSITIONS AS FREEZE CONDITIONING AGENTS FOR PARTICULATE SOLIDS

[75] Inventors: Kenneth E. Clapp, Wilmington, Del.; William D. Luzier, Mickleton, N.J.

[73] Assignee: ICI Americas Inc., Wilmington, Del.

[21] Appl. No.: 207,133

[22] Filed: Nov. 17, 1980

[51] Int. Cl.$^3$ .......................... C09K 3/18; C10K 5/00
[52] U.S. Cl. .................................... 427/220; 252/70; 44/6
[58] Field of Search ............... 252/70; 44/6; 427/215, 427/220, 212

[56] References Cited

U.S. PATENT DOCUMENTS 4,117,214  9/1978  Parks ......................................... 44/6

*Primary Examiner*—Sam Silverberg

[57] ABSTRACT

Hexitol borate salt solutions in combination with polyols effectively reduce the strength of ice crystals formed therefrom to enable solid particles coated therewith to remain substantially free flowing at temperatures as low as −20° C. Treatment of materials such as crushed coal, ore, stone and the like with compositions containing 5–60% by weight sorbitol borate salt and especially sodium sorbitol borate prior to freezing reduces the need for special handling to break up the frozen mass which occurs at temperatures below 0° C. A particularly useful sprayable aqueous solution contains 40–60% by weight sodium sorbitol borate and 20–40% ethylene glycol.

10 Claims, No Drawings

HEXITOL BORATE COMPOSITIONS AS FREEZE CONDITIONING AGENTS FOR PARTICULATE SOLIDS

Basic salts of hexitol borates in aqueous solutions in combination with polyols effectively reduce the strength of ice crystals formed therefrom to enable solid particles coated therewith to remain easily separable at temperatures as low as $-5°$ F. ($-20°$ C.). Treatment of material normally stored outdoors such as crushed coal, ore, stone, gravel and sand with the compositions of the invention prior to freezing eliminates the need for special handling to break up the frozen mass which occurs at temperatures below $0°$ C. Normally particulate solids stored at freezing temperatures have sufficient surface moisture to form ice bonds at particle-to-particle contact with adhesive forces so strong that it becomes difficult to unload or dump railway cars, trucks and storage bins. When untreated particulate becomes frozen, techniques for breaking up the particulate with steam lances, fires, vibrators and thaw sheds becomes necessary. Such techniques are time consuming and expensive.

Many approaches have been used with limited degrees of success to prevent interparticle cementation by the formation of ice. For example sodium and calcium chloride salts have been added to moist coal as it is being loaded with some degree of success toward reducing the freezing problem. However, such salts contribute to the corrosion of metal equipment with which the solids come in contact and are detrimental to the burning process when used with coal. Oil has been used to freeze-proof coal with questionable effectiveness. Oil soluble salts have been added to the oil but with questionable results. Ethylene glycol has been employed but although successful the cost of the treatment is very high. More recently, a commercially acceptable solution has been found as described in U.S. Pat. No. 4,117,214 to C. F. Parks, et al. 9/26/78. This method calls for treatment of particulate solids by spraying an effective amount of a strength reducing compound dissolved in water prior to freezing which comprises a water soluble hydroxy compound selected from alkylene glycols and up to two parts sodium acetate per part glycol. The application includes a rather complete description and history of the prior art in dealing with various treatments for particulates to prevent permanent cementation by ice formation.

While effective in reducing the strength of ice crystals formed on particulate solids the compositions of the prior art are somewhat lacking in that they are expensive, fail to inhibit corrosion suitably and are difficult to apply as low viscosity sprayable solutions at low temperatures. These weaknesses are overcome by the application of hexitol borates as described by the present invention.

It is an object of this invention to provide hexitol borate salt solutions useful in weakening interparticulate ice bonds formed on materials stored at low temperatures.

Another object of the invention is a process for the treatment of particulate solids such that when surface moisture of them is frozen the mass is easily broken apart.

These and other objects of the invention are accomplished by spraying particulate solid with low viscosity solutions of additives comprising one or more hexitol borate salts. Such additive containing solutions may be blended with a wide range of glycols, glycol ethers, polyhydroxy compounds, and ethoxylated or propoxylated compounds.

Hexitol borates as the term is understood herein comprise the mono and diborate salts of sorbitol, mannitol, dulcitol and other less common stereo isomers of hexahydric n-hexane. These materials are well known and can be made as taught in U.S. Pat. Nos. 2,223,349; 2,223,948 and 2,223,949. Water soluble salts of these materials are made by condensing either one or two mols of boric acid with one molar portion of the hexahydric alcohol alone or in the presence of one or two molar portions of strong base such as alkali, alkaline earth metal or ammonium hydroxides as well as organic amines. For example a preferred sodium sorbitol borate is made by condensing one molar portion of boric acid with one molar portion sorbitol which is thereafter neutralized by the addition of sodium hydroxide. Another preferred method involves dissolving borax in sorbitol solution. Usually mannitol occurs in minor portions with sorbitol and in referring to sorbitol borate one includes mixtures of sorbitol and mannitol. Hexitol borate solutions have been found to be most effective when the pH of the solution has been adjusted to at least 9 and preferably 9.1.

It is contemplated that any water soluble hexitol borate salt will sufficiently act as a freeze conditioning agent when applied in sufficient quantity to the particulate substrate. By water soluble is meant sufficiently soluble such that enough of the borate is dissolved in water to affect the strength of ice formed from water on the surface of the substrate.

Aqueous solutions of borate salts alone are useful as surface treating agents. Typical substrates are coal, minerals, ores, iron and copper ores, gravel, sand and in general non-porous materials which will not absorb the aqueous solution of the borate salt to such an extent that it becomes ineffective when combining with atmospheric moisture or rain water.

While hexitol borates are useful as aqueous solutions at temperatures above freezing their viscosity is insufficiently low to enable them to be sprayed at temperatures below $32°$ F. ($0°$ C.). Therefore, in order to obtain sprayable solutions at low temperatures a water soluble organic hydroxy compound is required as a viscosity control agent and freezing point lowering compound such as low molecular weight hydroxyalkanes for example ethylene glycol, diethylene glycol, triethylene glycol, propylene glycol, dipropylene glycol, glycerine and sugar. Normally ethylene glycol is particularly preferred. However, methanol, ethanol, propanol and other low molecular weight monohydric alcohols can be useful. In addition to these, monoalkyl ethers such as monobutylether of ethylene glycol can be employed.

Higher molecular weight alcohol ethers such as polyoxyethylene(6) tridecyl alcohol, polyoxyethylene(23) lauryl alcohol, polyoxyethylene(20) cetyl alcohol, polyoxyethylene(20) oleyl alcohol and propyleneoxide(1) sorbitol, polyoxyethylene(30) sorbitol are doubly active as surfactants and viscosity control agents at low temperatures.

Furthermore in addition to the alcohols and alcohol ethers are beneficially added surfactants such as isopropylamine dodecylbenzene sulfonate, polyoxyethylene(4) nonylphenol phosphate ester, polyoxyethylene(12) nonylphenol formaldehyde diethylamine monooleate, triethanolamine octyl phosphate and similar dispersing agents. Such materials act to wet the surface of the particulate to be coated as well as contribute to viscosity lowering at temperatures below 0° C.

The freeze conditioning agents are applied by spraying them uniformly onto the particulate such as moist minerals and coal prior to loading into railcars, silos, bunkers and other storage facilities. Before applying an effective amount the moisture content or expected moisture content of the particulate should be known. In some instances the concentrated hexitol borates viscosity control agent/water solution can be sprayed directly onto the particle when the moisture content is high. However when relatively dry particles are to be treated a more dilute aqueous solution can be employed to obtain the proper dosage. For example when wet coal containing 10-12% moisture is treated 0.07 grams of hexitol borate salt (dry wt) per 100 grams of coal is an effective dosage rate. Increasing dosage rates do not produce significant improvements in maintaining a free flowing coal at −5° F.

Effective sprayable concentrates which contain 5-60% by weight hexitol borate salt, 20-90% by weight viscosity control agents and varying amounts of water have been employed. A preferred hexitol borate salt is sodium sorbitol borate. A preferred viscosity control agent is ethylene glycol and blends of ethylene glycol with propylene glycol. A preferred composition for use in the invention is a sprayable concentrate consisting of 40% sodium sorbitol borate (80% aqueous solution), 40% ethylene glycol and 20% water. This blend has good corrosion resistance when the pH has been adjusted by the addition of sodium hydroxide to a pH of 9.1.

The following examples are intended to illustrate but not limit the scope of the invention and all proportions are reported as percent or parts by weight.

Three parts of an aqueous solution containing 70% sorbitol was mixed with one part boric acid and reacted for a period of one hour and thereafter concentrated sodium hydroxide was added until the solution measured a pH of 9.1. The resulting reaction mix contained approximately 80% by weight sodium sorbitol borate. This borate solution was used in the following examples with varying portions of water and viscosity control agents and in all the following examples a reference to parts by weight of sodium sorbitol borate (SSB) refers to an 80% aqueous solution unless otherwise specified.

EXAMPLE 1

A freeze conditioning agent (FCA) was prepared by blending 40% by weight sodium sorbitol borate solution, 40% ethylene glycol and 20% water. Viscosity measurements of this blend is shown in Table I.

TABLE I

| Viscosity FCA Example 1 | | | | | | | |
|---|---|---|---|---|---|---|---|
| Temp. °C. | 25 | 15.6 | 10 | 0 | −10 | −20 | −30 |
| Viscosity (centistokes) | 17.4 | 27.8 | 37.9 | 71.0 | 152.5 | 376.8 | 1033.1 |

EXAMPLES 2-9

Various freeze conditioning agents (FCA) of the invention were evaluated by applying to coal samples as follows: 100 gram samples of Indiana coal obtained from Amax Coal Company which was screened to remove powder and particles greater than about one half inch in diameter was dried in an oven at temperatures above 100° C. and then spread evenly on a piece of waxed paper. The coal was then sprayed with 11 mls. of a 0.7% solution of FCA additive and water by using a conventional sprayer. This spraying procedure produced an 0.7% additive dosage based on the dry wt. of the coal and a 10-11% moisture content since all the solution did not stick on the coal. The treated coal was placed in a paper cylinder measuring seven and one half inches in circumference and refrigerated at approximately −5° F. for a minimum of 16 hours. The samples were stored in a cold room at −5° F. and were tested by manual crushing and evaluating them on a scale of 0-10 where 0 is defined as the control for untreated coal having a 10% moisture content and 10 as unfrozen coal. Treated coal was judged in like manner. The results of these hand crushing tests are indicated in Table II for various FCA compositions.

TABLE II

| Ex. No. | FCA Composition | Dosage % FCA on coal* | Performance | |
|---|---|---|---|---|
| | | | Crushing | Breaking |
| 2 | Sodium sorbitol borate (SSB); | .056 | 3 | 3-4 |
| 3 | 10% (SSB); 90% propylene glycol | .069 | 3 | 3-4 |
| 4 | 50% (SSB); 50% propylene glycol | .063 | 2-3 | 3 |
| 5 | 60% (SSB); 40% propylene glycol | .062 | 2-3 | 3 |
| 6 | 60% SSB; 20% ethylene glycol; 20% H$_2$O | .048 | 2-3 | 1-2 |
| 7 | 50% SSB; 30% ethylene glycol; 20% H$_2$O | .049 | 1 | 1-2 |
| 8 | 40% SSB; 40% ethylene glycol; 20% H$_2$O | .050 | 2-3 | 2-3 |
| 9 | 40% SSB; 20% ethylene glycol; 20% propylene glycol; 20% H$_2$O | .050 | 2-3 | 2-3 |

*% Dry FCA on Dry Coal

EXAMPLES 10-17

Various FCA compositions were evaluated according to a procedure similar to that outlined for Examples 2-9 employing varying dosage rates on the coal and thereafter evaluated at −5° F. for crushing and breaking. The compositions and results of this performance evaluation is listed in Table III.

TABLE III

| Ex. No. | FCA Composition | Dosage %* FCA on Coal | Performance | |
|---|---|---|---|---|
| | | | Crushing | Breaking |
| Control | (none) | 0 | 0 | 0 |
| 10 | 60% SSB; 20% ethylene glycol; 20% H$_2$O | 0.10 | 2-4 | 2-3 |
| 11 | 60% SSB; 20% ethylene glycol; 20% H$_2$O | 0.56 | 3-4 | 3-4 |
| 12 | 60% SSB; 10% ethylene glycol; 10% propylene glycol; 20% H$_2$O | 0.10 | 2 | 2-3 |
| 13 | 60% SSB; 10% ethylene glycol; 10% propylene glycol; 20% H$_2$O | 0.56 | 2 | 2 |
| 14 | 40% SSB; 20% ethylene glycol; 20% propylene glycol; 20% H$_2$O | 0.11 | 3-4 | 3 |
| 15 | 40% SSB; 20% ethylene glycol; 20% propylene glycol; 20% H$_2$O | 0.60 | 3-4 | 3-4 |
| 16 | 40% SSB; 20% ethylene glycol; 20% propylene glycol; 20% H$_2$O | 0.73 | 4 | 3-4 |
| 17 | 40% SSB; 40% ethylene | | | |

TABLE III-continued

| Ex. No. | FCA Composition | Dosage %* FCA on Coal | Performance Crushing | Breaking |
| --- | --- | --- | --- | --- |
| | glycol; 20% H₂O | 0.11 | 3 | 2-3 |

*% Dry FCA on Dry Coal

EXAMPLE 18

One car of a ten-car shipment of Canadian steam coal was treated during loading with the composition of Example 1 at a dosage rate of two pounds per ton of coal employing a pair of 0.3 gpm nozzles. The coal loading rate was 210 tons per hour. Weather conditions were clear with 0°–10° F. temperatures. On arrival at the unloading site the next morning the unloading operation required only two minutes for the treated coal versus four to six minutes for the untreated coal.

EXAMPLE 19

One car of Canadian steam coal was treated as described in Example 18. The balance of the ten-car shipment was untreated. Weather conditions were cloudy and 25° F. with rain expected. The cars arrived at the unloading site during the following afternoon. The treated coal unloaded easily with very little shaking. The untreated cars were badly frozen requiring until 5 a.m. the following morning for unloading.

EXAMPLE 20

Four cars of a ten-car Canadian steam coal shipment were treated as described in Example 18. Weather conditions were just below freezing with heavy snow. The cars arrived at the unloading site the following evening. Blizzard conditions existed which hampered the unloading operation. The foreman in charge of unloading reported a significant difference between the unloading of the treated versus untreated cars. Three treated cars required only five to ten minutes for unloading. The fourth treated car required thirty minutes and all untreated cars a minimum of thirty minutes for unloading.

What is claimed is:

1. A sprayable freeze conditioning agent for application to particulate solids which comprises effective amounts of a water soluble hexitol borate salt additive and a viscosity control agent and freezing point lowering compounds selected from the group consisting of low molecular weight mono, di and trihydroxy alkanes, and higher molecular weight polyoxyethylene or polyoxypropylene derivatives of polyols in an aqueous solution.

2. A freeze conditioning agent solution of claim 1 wherein said freeze conditioning additive is selected from the group consisting of alkali metal, alkaline earth metal, ammonium and organic amine salts of sorbitol mono and diborate.

3. A freeze conditioning agent of claim 1 wherein said viscosity control agent is selected from the group consisting of methanol ethanol, propanol, ethylene glycol, diethylene glycol, triethylene glycol, propylene glycol, dipropylene glycol, glycerine, sugar, polyoxyethylene(6) tridecyl alcohol, polyoxyethylene(23) lauryl alcohol, polyoxyethylene(20) cetyl alcohol, polyoxyethylene(20) oleyl alcohol and propyleneoxide(1) sorbitol and polyoxyethylene(30) sorbitol.

4. A freeze conditioning agent of claim 1 further comprising a surfactant.

5. A freeze conditioning agent of claim 4 wherein said surfactant is selected from the group consisting of isopropylamine based dodecylbenzene sulfonate, polyoxyethylene(4) nonylphenol phosphate ester, polyoxyethylene(12) nonylphenol formaldehyde diethylamine monooleate, triethanolamine octyl phosphate and polyoxyethylene(30) sorbitol.

6. A freeze conditioning agent of claim 1 which comprises 40–60% by weight of said hexitol borate additive and 20–40% by weight of said viscosity control agent.

7. A composition of claim 1 which comprises 5–60% by weight of sodium sorbitol borate and 20–90% by weight ethylene glycol.

8. A freeze conditioning agent of claim 1 having a pH greater than 9.

9. A method for treating particulate solids having surface moisture to reduce the cohesive strength of masses of such solids when frozen, which comprises spraying such solids with an effective amount of a composition of claim 1.

10. The method claimed in claim 9 wherein said composition is applied to said particulate solid in an amount of at least 0.048% by weight of dry freeze conditioning agent based on the weight of the dry coal.

* * * * *